July 26, 1960

L. POKORNY ET AL 2,946,546

FISHING ROD SUPPORT

Filed Dec. 31, 1959

INVENTORS:
LOUIS POKORNY
ANTHONY F. LEIS
BY
Frederick Breitenfeld
ATTORNEY

United States Patent Office 2,946,546
Patented July 26, 1960

2,946,546
FISHING ROD SUPPORT

Louis Pokorny, Cedar Ave., Ronkonkoma, N.Y., and Anthony F. Leis, Shore Road, Oakdale, N.Y.

Filed Dec. 31, 1959, Ser. No. 863,233

7 Claims. (Cl. 248—40)

This invention relates to fishing rod holders and has particular reference to the type of holder which permits pivotal movements in two mutually perpendicular planes.

It is a principal object of this invention to provide a fishing rod holder which may be fabricated and assembled rapidly and inexpensively on a mass-production basis. Toward this end, the present holder has been so conceived that all its parts save one may be formed by a stamping operation, and the remaining part is simply a section of extruded tubing.

Another object of the invention is to provide a fishing rod holder which may be readily and securely fastened to a support and may be just as easily removed from the support when desired. The type of support for which the device is primarily intended is the rung of a chair such as the front element of the seat of a chair having a tubular metal frame.

A further object is to provide a holder which is simple to use, sturdy in construction, and reliable in operation.

Another object is to provide a holder which is compact and lightweight for easy transportation.

Still another object is to provide a holder which may be easily disassembled and reassembled for shipping and cleaning purposes.

Briefly stated, the improved device comprises a tubular member adapted to receive and hold the rear end of a fishing rod, this member being pivotally supported by a pair of trunnions mounted on a ring which surrounds the member, the trunnions being so located that the member is pivotal about an axis coincident with a diameter of the ring. The ring in turn is disposed within a bearing so that it is rotatable about an axis perpendicular to the axis of the trunnions. The bearing is sandwiched between a pair of supporting walls which are provided with clamping portions for removably securing the assembly of parts to a stationary support such as a seat frame or the like.

Other objects and advantages of the present invention will be apparent from the following description in which reference is made to the accompanying drawings.

Figure 1:
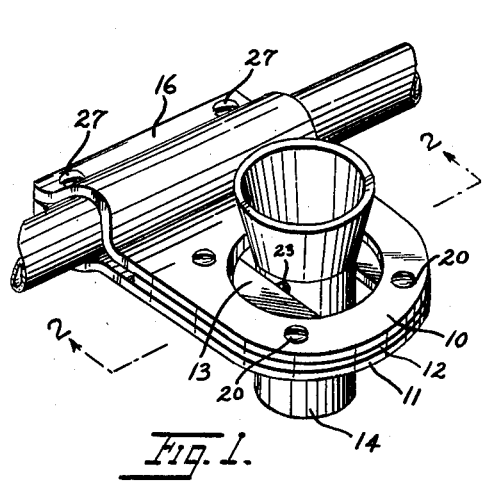
Fig. 1 is a perspective view of the assembled fishing rod holder mounted on a stationary rod-like support.

Referring now to the drawings, the invention comprises generally a pair of spaced parallel supporting walls 10 and 11, a bearing 12 sandwiched between the walls, a disc-shaped ring 13 disposed in the bearing, and a tubular member 14 adapted to receive the rear end of a fishing rod and pivotally mounted within the ring.

The supporting walls 10 and 11 whose forward ends are preferably somewhat semi-circularly shaped, are each provided with a hole 15. In the embodiment shown in Figs. 1, 2 and 3, these walls have rearwardly-extending clamping portions 16 and 17 respectively. Each of the supporting walls is in addition provided with a number of aligned holes 18 adapted to receive the fasteners 20. Furthermore, each of the clamping portions 16 and 17 is provided with holes 19 adapted to receive the fasteners 27. As may be seen clearly in Fig. 1, when the fasteners 27 are employed to draw the clamping portions together the latter cooperate to grip a stationary supporting member such as the rod-like member 21, which may be an element of a tubular frame chair, and thus maintain the holder securely in the position shown. It will be appreciated that the supporting walls 10 and 11 may readily be formed out of metal by means of simple stamping operations.

Sandwiched between these supporting walls is a bearing 12 whose forward edge has a semi-circular or other shape to conform to the shape of the supporting walls. The bearing 12 is provided with a circular hole 21 whose diameter is larger than the diameter of the holes 15 in the supporting walls. It may be seen, therefore, that when the two supporting walls and the bearing are arranged in superposed relation an annular slot will be formed at the level of the bearing. The bearing is also provided with a number of holes 22 which coincide with the holes 18 in the supporting walls. Each fastener 20 therefore passes through three aligned holes, two in the supporting walls 10 and 11 and one in the bearing 12, and thus holds the three members together. The rearward end of the bearing may be cut off square, as close to the hole 21 as possible, so that the bearing does not interfere with the cooperating relationship of the clamping portions 16 and 17. It will be seen that the bearing 12, like walls 16 and 17, may be easily fabricated by a stamping operation.

The ring 13, when operatively positioned, has a diameter slightly less than the diameter of the hole 21 in the bearing 12. The ring 13, therefore, fits into the above-mentioned annular slot between the supporting walls 10 and 11, and is rotatable therein with respect to the bearing 12. The ring may not be removed from the slot, however, unless the fasteners 20 are removed and the parts are disassembled. The hole in the ring 13 is substantially circular except that at two diametrically opposed sections the hole is squared off to provide additional metal and strength. Projecting inwardly from these squared-off sections, and along a diameter of the ring, are a pair of trunnions 23. Preferably, the trunnions are formed integrally with the ring 13 so that they may be stamped out with the ring. Along a diameter of the ring perpendicular to the axis of the trunnions 23 the ring is split to produce the two sections shown in Fig. 3. The reason for employing a split ring will be mentioned below.

Pivotally supported on the trunnions 23 is a tubular rod-accommodating member 14. This is the only member of the device which is not formed by stamping. The member 14 consists of a section of extruded tubing whose upper end has been swaged or deformed in some other manner, to give the member an outwardly diverging mouth in order to facilitate the insertion of the rear end of a fishing rod. The lower end of the tubular member 14 is provided with a diametrically-disposed pin 24 which is engaged by the usual slot on the lower end of the fishing rod and thus prevents relative rotational movement between the fishing rod and the tubular member. Intermediate the ends of the tubular member are a pair of diametrically opposed holes 25 adapted to accommodate the trunnions 23 and thus provide a pivotal support for the tubular member. It is now obvious that the reason for using the split ring 13 is to permit the assembling of the ring with the tubular member 14.

The non-deformed portion of the member 14 has a diameter quite smaller than the holes 15 in the supporting walls 10 and 11 in order to permit free pivotal movement of the member 14.

In assembling the device the tubular member 14 is first surrounded by the ring 13 with the trunnions 23 engaging the holes 25. The ring 13 is then fitted into the hole 21 in the bearing 12 and the unit is then sandwiched between the upper and lower supporting walls 10 and 11. The fasteners 20 are then threaded through the holes 18 and 22 and the fasteners 27 are threaded through the holes 19 in the clamping portions 16 and 17. The tubular rod-accommodating member is thus not only pivotable about a horizontal axis, by virtue of its support on the trunnions 23, but may also be rotated about a vertical axis, together with the ring 13, as the latter rotates on its own axis within the confines of the bearing 12.

Figure 4:
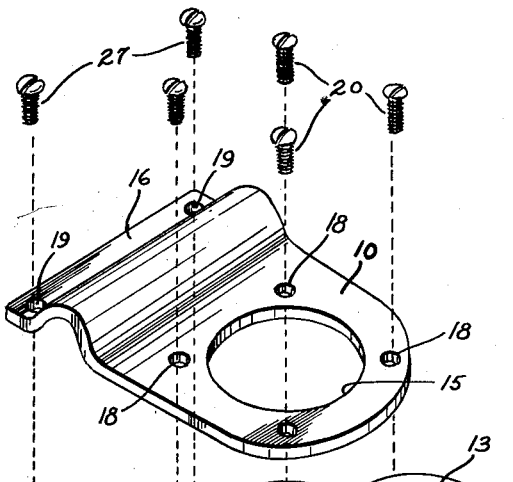
Fig. 4 is a horizontal cross-sectional view of an alternative embodiment of the invention taken on line 4—4 of Fig. 5.
Figure 4:
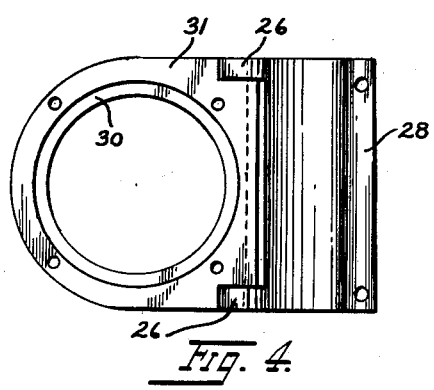
Figure 5:
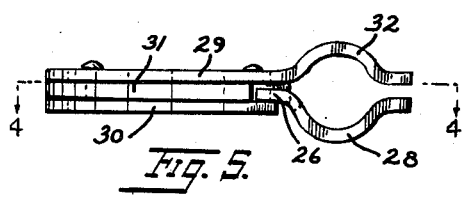
Fig. 5 is a side elevational view of the alternate embodiment.
Figure 2:
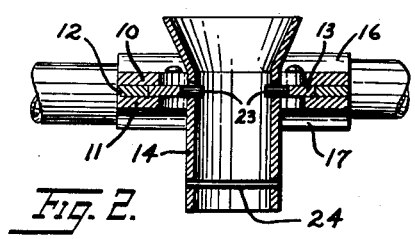
Fig. 2 is a vertical cross-sectional view taken on line 2—2 of Fig. 1.
Figure 3:
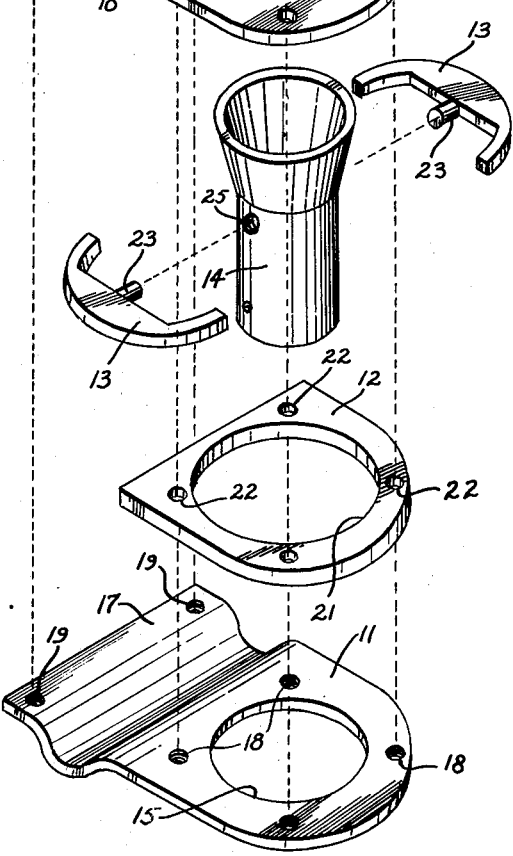
Fig. 3 is an exploded view of the holder showing the individual parts.

In the embodiment of the invention as shown in Figs. 1-3, the engagement of the clamping portions 16 and 17 with a rod or chair rung necessitates the separation of at least one of the walls 10, 11 from the rest of the assembly. Figs. 4 and 5 are directed to an alternative embodiment of the invention, wherein one of the clamping portions, in this case of lower clamping portion 28, is made separable or independent of the supporting wall with which it is associated. The independent clamping portion 28 is provided with forwardly projecting lips 26 which are inserted between the supporting walls 29, 30 and are urged outwardly to bear against the inward face of the adjacent supporting wall 30 when the fasteners 27 (not shown in Figs. 4 and 5) draw the clamping portions 28 and 32 together to secure the holder to a stationary support. In order that there may be no interference between the lips 26 and the bearing 31, the bearing is notched at its two rearward corners in order to make room for these lips.

The advantage of the assembly shown in Figs. 4 and 5 is that it is not necessary to disassemble the device completely in order to fasten it to a support. In the structure of Figs. 1-3, all six of the fasteners 20 must be removed before the holder can be mounted on or removed from a chair rail or other support.

It will thus be seen that an extremely simple series of manufacturing and assembly operations are involved in producing the improved device on a commercial scale. The walls 10, 11, the bearing 12, and the split ring parts 13, may all be stamped from sheet stock composed, for example (but not necessarily) of chrome-plated brass, or stainless steel. (In the case of the ring sections the rounding of the trunnions 23 may involve a simple additional machining.) The tubular part 14 is readily swaged and drilled, the tapped holes for the fasteners 20, 27 are quickly formed, and the final assembly is one which requires no special or unusual skill or tools.

It is understood that many of the details herein described and illustrated may be modified by those skilled in the art without necessarily departing from the spirit and scope of the invention as expressed in the appended claims.

What is claimed is:

1. A fishing rod holder comprising a pair of spaced parallel supporting walls having aligned openings therein, a bearing sandwiched between said walls and in axial alignment with said openings, a disc-shaped ring in said bearing capable of rotation in the plane of said bearing, trunnions on said ring projecting inwardly along a diameter thereof, and a tubular rod-accommodating member arranged inside said ring and having a pair of holes in its side wall for accommodating said trunnions.

2. A fishing rod holder according to claim 1 wherein said supporting walls are each provided with a hole concentric with said bearing and smaller in diameter than the internal diameter of said bearing, in order to form an annular slot for accommodating said rotatable ring, each of the holes in said supporting walls being larger in diameter than said tubular member in order to permit free pivotal movement of the latter.

3. A fishing rod holder comprising a tubular rod-accommodating member having a pair of holes diametrically disposed in its side wall, a ring having a pair of inwardly facing trunnions received by the holes in said tubular member, said ring being split along a line perpendicular to the axis of the trunnions in order to permit assembly of the ring and tubular member, a bearing in which said ring is arranged to rotate, and upper and lower supporting walls disposed respectively above and below said bearing and provided with aligned openings through which said tubular member extends as it pivots on said trunnions.

4. A fishing rod holder comprising upper and lower supporting walls each having a hole concentric with the hole in the other, a pair of cooperating clamping portions integral with each of said supporting walls respectively, said clamping portions adapted for engagement with a stationary rod-like support, a bearing sandwiched between said walls concentric with the holes therein and having an internal diameter larger than said holes, a ring split along one of its diameters located in said bearing and capable of rotation in the plane of said bearing, trunnions integral with said ring and projecting inwardly along a diameter transverse to the line of split, and a tubular rod-accommodating member arranged inside said ring and having a pair of diametrically opposed holes in its side wall for accommodating said trunnions.

5. A fishing rod holder according to claim 4 wherein one of said clamping portions is independent of its respective supporting wall.

6. A fishing rod holder according to claim 5 wherein said independent clamping portion is provided with at least one lip adapted to contact the inward face of said supporting wall when the holder is mounted on a stationary support.

7. A fishing rod holder comprising upper and lower parallel supporting walls having aligned front edges substantially semi-circular in contour, each wall having a hole whose center coincides with the center of curvature of the semi-circle, a pair of cooperating clamping portions integral with the rear part of each of said supporting walls respectively, said clamping portions adapted for engagement with a stationary rod-like support, fastening means maintaining said supporting walls in superposed relation so that the holes in said walls are concentrically arranged, a bearing sandwiched between said walls and conforming to the shape of said walls, said bearing being concentric with the holes in said supporting walls and having an internal diameter larger than said holes, a ring split along one of its diameters located in said bearing concentrically therewith and capable of rotation in the plane of said bearing, trunnions integral with said ring and projecting inwardly along a diameter transverse to the line of split, and a tubular rod-accommodating member arranged inside said ring and having a pair of diametrically opposed holes in its side wall for accommodating said trunnions.

References Cited in the file of this patent
UNITED STATES PATENTS

| 1,078,006 | Skeen et al. | Nov. 11, 1913 |
| 2,711,299 | Dugle | June 21, 1955 |